(12) United States Patent
Qu et al.

(10) Patent No.: US 12,256,299 B2
(45) Date of Patent: Mar. 18, 2025

(54) METHOD AND APPARATUS FOR PROVIDING A USER EQUIPMENT WITH DIRECTIONS IN A COMMUNICATION NETWORK

(71) Applicant: Telefonaktiebolaget LM Ericsson (publ), Stockholm (SE)

(72) Inventors: Zhiwei Qu, Shanghai (CN); Jueqi Wang, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 413 days.

(21) Appl. No.: 17/417,150

(22) PCT Filed: Dec. 29, 2018

(86) PCT No.: PCT/CN2018/125329
§ 371 (c)(1),
(2) Date: Jun. 22, 2021

(87) PCT Pub. No.: WO2020/133345
PCT Pub. Date: Jul. 2, 2020

(65) Prior Publication Data
US 2022/0078592 A1    Mar. 10, 2022

(51) Int. Cl.
*H04W 4/14*    (2009.01)
*H04W 4/50*    (2018.01)

(52) U.S. Cl.
CPC .............. *H04W 4/50* (2018.02); *H04W 4/14* (2013.01)

(58) Field of Classification Search
CPC ................................ H04W 4/14; H04W 4/50
See application file for complete search history.

(56) References Cited

U.S. PATENT DOCUMENTS

| | | | |
|---|---|---|---|
| 9,237,465 B1* | 1/2016 | Tanner | .................. H04W 4/50 |
| 2002/0138782 A1* | 9/2002 | Durrant | ............... G06F 11/0727 |
| | | | 714/E11.026 |

(Continued)

FOREIGN PATENT DOCUMENTS

| | | |
|---|---|---|
| CN | 108834104 A | 11/2018 |
| EP | 2568728 A2 | 3/2013 |

(Continued)

OTHER PUBLICATIONS

Extended European Search Report for European Patent Application No. 18944311.2 mailed Jul. 4, 2022, 7 pages.

(Continued)

*Primary Examiner* — Jinsong Hu
*Assistant Examiner* — Farideh Madani
(74) *Attorney, Agent, or Firm* — Sage Patent Group

(57) ABSTRACT

The present invention generally relates to wireless communication technology. More particularly, the present invention relates to a method for providing a user equipment (UE) with directions in a communication network. The present invention also relates to apparatus and computer program product adapted for the same purpose. According to one aspect of the present invention, a method for performed by a network function (NF) for access and mobility management for providing directions to a user equipment (UE) in a communication network, the method comprising: a) instructing a short message service function (SMSF) to generate a message including the directions; b) receiving from the SMSF the message including the directions; and c) forwarding the message including the directions to the UE.

13 Claims, 6 Drawing Sheets

(56) References Cited

U.S. PATENT DOCUMENTS

2007/0253336 A1* 11/2007 Martinez ............ H04L 43/0817
370/242
2013/0137397 A1   5/2013 Sigmund et al.
2019/0037407 A1* 1/2019 Nair ................. H04L 63/164

FOREIGN PATENT DOCUMENTS

EP          2858389 A1    4/2015
EP          1209886 A2    5/2022
WO         1999016265 A1  4/1999
WO     WO-2018208283 A1 * 11/2018  ............ H04W 4/14

OTHER PUBLICATIONS

3rd Generation Partnership Project, "Technical Specification Group Core Network and Terminals; Extensible Markup Language (XML) Configuration Access Protocol (XCAP) over the Ut interface for Manipulating Supplementary Services (Release 15)", 3GPP TS 24.623 v15.0.0, Jun. 1, 2018, pp. 1-29.
Communication pursuant to Article 94(3) EPC mailed Jun. 18, 2024 for European Patent Application No. 18944311.2, 5 pages.

* cited by examiner

METHOD AND APPARATUS FOR PROVIDING A USER EQUIPMENT WITH DIRECTIONS IN A COMMUNICATION NETWORK

TECHNICAL FIELD

The present invention generally relates to wireless communication technology. More particularly, the present invention relates to a method for providing a user equipment (UE) with directions in a communication network, e.g., cellular network. The present invention also relates to apparatus and computer program product adapted for the same purpose.

BACKGROUND

Sometimes if a request from a UE is rejected at network side, a response, e.g., over Non-access Stratum (NAS), may be returned to the UE for specifying reason(s) or faults. These reasons or faults may be classified into a plurality of categories, which are encoded by e.g., NAS cause code. The examples of the NAS cause code include:
Missing or Unknown APN (#27)
Unknown PDP Address or PDP Type (#28)
Service Option not Supported (#32)
Requested Service Option not Subscribed (#33)
Network Failure (#38)
Maximum Number of PDP Contexts Reached (#65)

However, encoded indicators may be unintelligible and even invisible for end-users and thus make them helpless when confronting a rejection response. For instance, in the case where default parameters in a new cellular phone do not comply with the configuration as required by a local network operator, the phone will be continuously rejected to access to the network and its end-user cannot understand what it happens. This will make him or her unpleasant and bring about complaints.

SUMMARY OF THE INVENTION

According to one aspect of the present invention, method performed by a network function (NF) for access and mobility management for providing directions to a user equipment (UE) in a communication network, the method comprising:
  a) instructing a short message service function (SMSF) to generate a message including the directions;
  b) receiving from the SMSF the message including the directions; and
  c) forwarding the message including the directions to the UE.

According to another aspect of the present invention, an apparatus for providing directions to a user equipment (UE) in a communication network, be characterized by comprising:
  a storage device configured to store a computer program comprising computer instructions; and
  a processor coupled to the storage device and configured to execute the computer instructions to:
  a) instruct a short message service function (SMSF) to generate a message including the directions;
  b) receive from the SMSF the message including the directions; and
  c) forward the message including the directions to the UE.

According to another aspect of the present invention, computer program product for providing directions to a user equipment (UE) in a communication network, the computer program product being embodied in a computer readable storage medium and comprising computer instructions for:
  a) instructing a short message service function (SMSF) to generate a message including the directions;
  b) receiving from the SMSF the message including the directions; and
  c) forwarding the message including the directions to the UE.

According to another aspect of the present invention, a method performed by a short message service function (SMSF) for providing directions to a user equipment (UE) in a communication network, the method comprising:
  a) in response to an instruction received from a network function (NF) for access and mobility management, generating a message including the directions; and
  b) transmitting to the UE the message including the directions via the NF for access and mobility management.

According to another aspect of the present invention, an apparatus for providing directions to a user equipment (UE) in a communication network, be characterized by comprising:
  a storage device configured to store a computer program comprising computer instructions; and
  a processor coupled to the storage device and configured to execute the computer instructions to:
  a) in response to an instruction received from a network function (NF) for access and mobility management, generate a message including the directions; and
  b) transmit to the UE the message including the directions via the NF for access and mobility management.

According to another aspect of the present invention, a computer program product for providing directions to a user equipment (UE) in a communication network, the computer program product being embodied in a computer readable storage medium and comprising computer instructions for:
  a) in response to an instruction received from a network function (NF) for access and mobility management, generating a message including the directions; and
  b) transmitting to the UE the message including the directions via the NF for access and mobility management.

According to another aspect of the present invention, a method performed by a network function (NF) for user profile management for providing directions to a user equipment (UE) in a communication network, the method comprising:
  a) determining whether there are directions that need to be transferred to the UE; and
  b) if there are directions that need to be transferred, invoking SMS capability supplied by a short message service function (SMSF) by transmitting SMS contents including the directions.

According to another aspect of the present invention, an apparatus for providing directions to a user equipment (UE) in a communication network, be characterized by comprising:
  a storage device configured to store a computer program comprising computer instructions; and
  a processor coupled to the storage device and configured to execute the computer instructions to:
  a) determining whether there are directions that need to be transferred to the UE; and
  b) if there are directions that need to be transferred, invoking SMS capability supplied by a short message service function (SMSF) by transmitting SMS contents including the directions.

According to another aspect of the present invention, a computer program product for providing directions to a user equipment (UE) in a communication network, the computer program product being embodied in a computer readable storage medium and comprising computer instructions for:
  a) determining whether there are directions that need to be transferred to the UE; and
  b) if there are directions that need to be transferred, invoking SMS capability supplied by a short message service function (SMSF) by transmitting SMS contents including the directions.

In one or more embodiments of the present invention, it provides end-users with directions for troubleshooting via SMS. With the directions, the end-users can take appropriate actions to solve the problems concerning their UEs. The transmission of the directions in SMS is advantageous as it may present a concise and clear guideline on troubleshooting in a cost-effective manner.

Moreover, the directions may be broadcasted in a group of the subscribers or UEs as required by services. Through notifying specific subscribers, e.g., trusted users, of new services or network functions, it may also facilitate the test thereof.

BRIEF DESCRIPTION OF THE DRAWINGS

The foregoing and other objects, features, and advantages of the invention would be apparent from the following more particular description of preferred embodiments as illustrated in the accompanying drawings in which.

DETAILED DESCRIPTION

Figure 1:
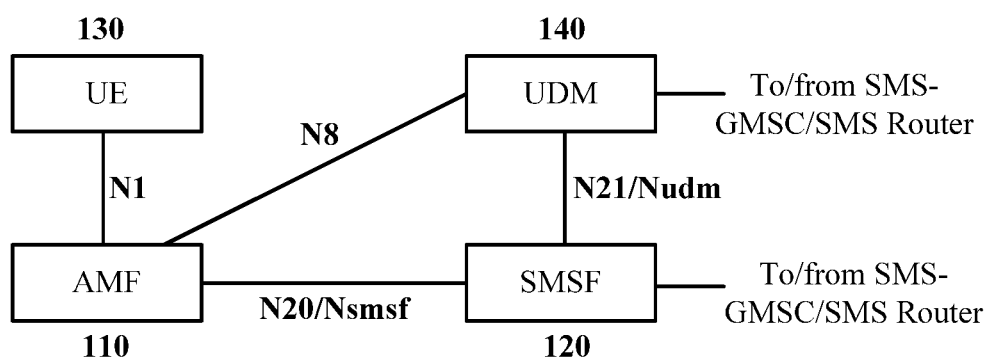
FIG. 1 shows system architecture for SMS over NAS.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "user equipment" or "UE" may refer to a device used directly by an end-user to communicate. The non-exclusive examples of the UE include a hand-held telephone, a laptop computer equipped with a mobile broadband adapter, or any other device.

As used herein, the term "directions" may refer to instructions or information about how to do something. For example, the directions may be concerned with at least one of the following operations: adjusting operational parameters of the UE, reporting an occurrence of a fault at the UE, tracing and correcting a fault occurring at the UE, and testing new NF(s) at the UE.

In one or more embodiments, directions, e.g., in form of SMS, are transmitted from network side to one or more ender users, who, in turn, can take appropriate actions under the directions.

5G core network is considered as a service-based architecture, with which one network function (NF) could be accessible for any other NFs. So does Short Message Service Function (SMSF). In one or more embodiments of the present invention, in case an NF, e.g. Access and Mobility Management Function (AMF) or Unified Database Management (UDM), intends to provide one or more targeted UEs with directions, it utilizes SMSF to generate a SMS including the directions, which is, in turn, transmitted to the targeted UEs.

FIG. 1 shows system architecture for SMS over NAS. In the architecture as shown in FIG. 1, AMF 110 is connected to SMSF 120 via N20/Nsmsf interface and to UE 130 via N1 interface. Furthermore, UDM 140) is connected to AMF 110 via N8 interface and to SMSF 120 via N21/Nudm interface. On the other hand, SMSF 120 and UDM 140 may be connected to SMS-GMSC/IWMSC/SMS router. Each of UEs is associated with only one SMSF in registered PLMN. When serving AMF is re-allocated for a given UE, the source AMF includes SMSF identifier as part of UE context transfer to target AMF.

For illustrative purpose, the following embodiments are described in the context of the above architecture as shown in FIG. 1. However, one skilled artisan in the art would recognize that the present invention is applicable to other architectures.

Figure 2:
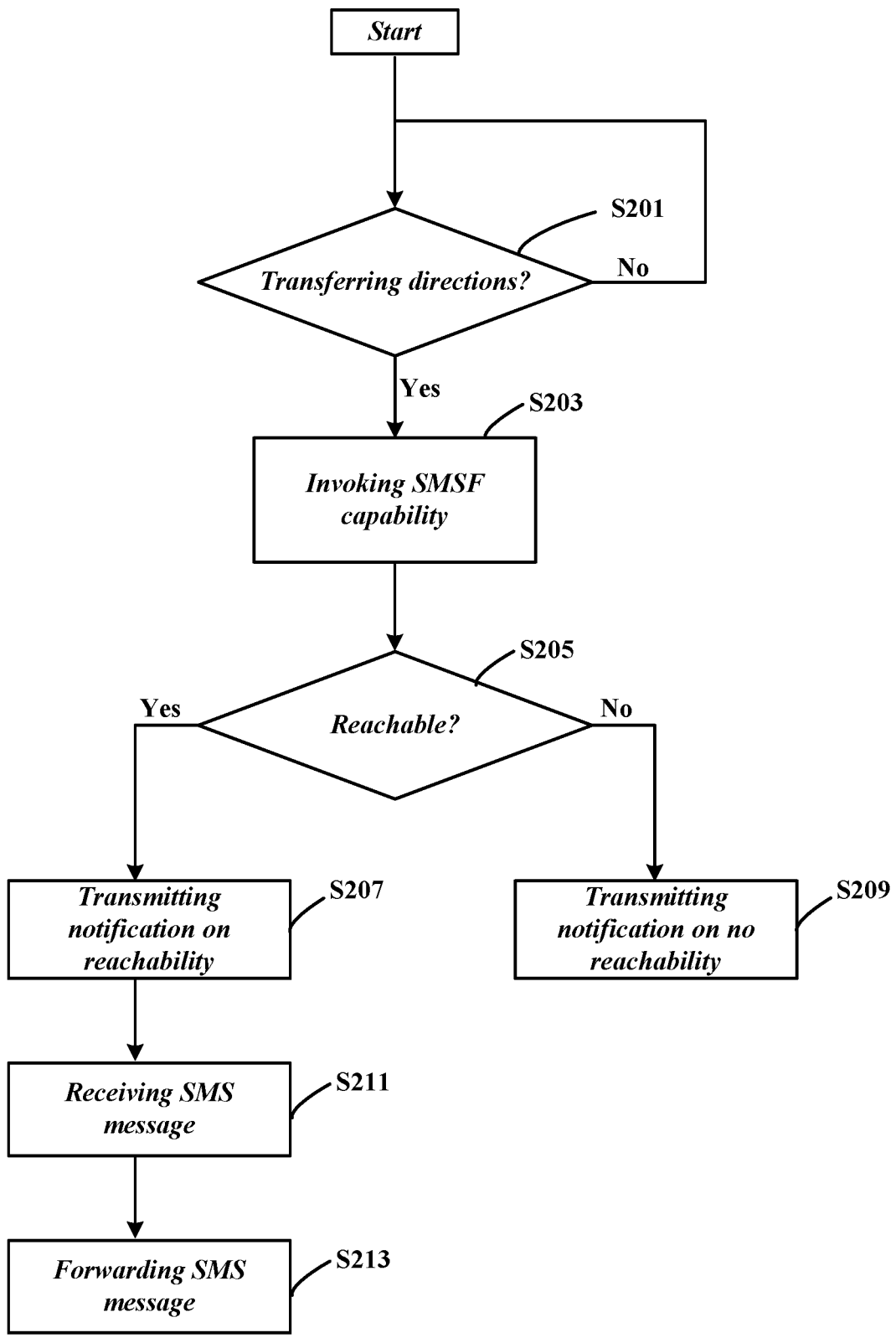
FIG. 2 is a flow diagram illustrating a process for providing a user equipment (UE) with directions in a cellular network according to one exemplary embodiment of the present invention.

FIG. 2 is a flow diagram illustrating a process for providing a user equipment (UE) with directions in a cellular network according to one exemplary embodiment of the present invention.

With reference to FIG. 2, at step S201, an NF for access and mobility management, e.g., AMF 110, determines whether there are directions that need to be transferred to a specified UE, e.g., UE 130. If need, the process proceeds to step S203.

At step S203, AMF 110 invokes SMS capability supplied by SMSF 120, e.g., by transmitting SMS contents concerning the directions and a target UE identifier. Accordingly, SMSF 120 generates a SMS message including the SMS contents and the target UE identifier.

Then, optionally, the process proceeds to step S205 where AMF 110 determines whether a short message service (SMS) is reachable or attainable at the target UE. If it is reachable, the process proceeds to step S207 where AMF 110 transmits to SMSF 120 a notification that the SMS is reachable; otherwise, the process proceeds to S209 where AMF 110 transmits to SMSF 120 a notification that the SMS is not reachable.

Continuing with step S207, at step S211, AMF 110 receives from SMSF 120 the SMS message including the directions and the target UE identifier.

The process then proceeds to step S213 where AMF 110 forwards the message to the target UE, e.g., UE 130.

In the process as shown in FIG. 2, the reachability check may be omitted. That is, the process may skip from step S203 to S211.

Figure 3:
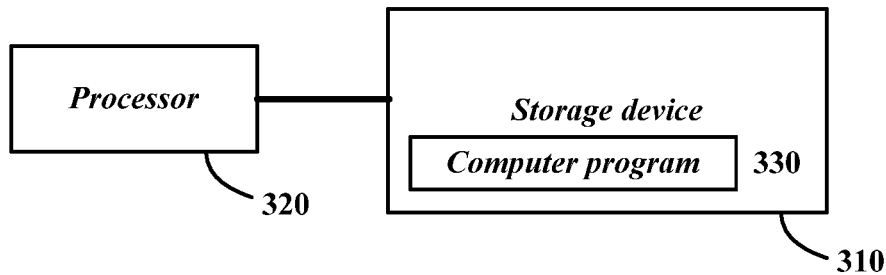
FIG. 3 is a block diagram illustrating an apparatus for providing a user equipment (UE) with directions in a cellular network according to another exemplary embodiment of the present invention.

FIG. 3 is a block diagram illustrating an apparatus for providing a user equipment (UE) with directions in a cellular network according to another exemplary embodiment of the present invention.

With reference to FIG. 3, the apparatus 30 comprises a storage device 310 and a processor 320 coupled to the storage device 310. The storage device 310 is configured to store a computer program 330 comprising computer instructions. The processor 320 is configured to execute the computer instructions to perform some or all of the method steps as shown in FIG. 2.

According to another embodiments of the present invention, it provides a computer program product for providing a user equipment (UE) with directions in a cellular network, the computer program product being embodied in a computer readable storage medium and comprising computer instructions to perform some or all of the method steps as shown in FIG. 2.

Figure 4:
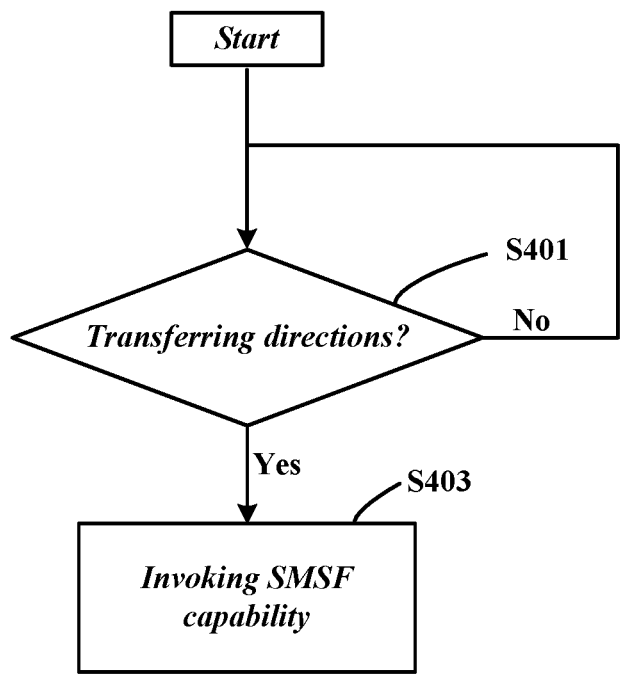
FIG. 4 is a flow diagram illustrating a process for providing a user equipment (UE) with directions in a cellular network according to another exemplary embodiment of the present invention.

FIG. 4 is a flow diagram illustrating a process for providing a user equipment (UE) with directions in a cellular network according to another exemplary embodiment of the present invention.

With reference to FIG. 4, at step S401, a user profile server, e.g., UDM 140, determines whether there are directions that need to be transferred to a specified UE, e.g., UE 130. If need, the process proceeds to step S403.

At step S403, UDM 140 invokes SMS capability supplied by SMSF 120, e.g., by transmitting SMS contents concerning the directions and target UE identifier. As a response, SMSF 120 generates a SMS message including the SMS contents and the target UE identifier and transmits to the target UE, e.g., UE 130, the SMS message via AMF 110.

For illustrative purpose, the SMS transmission procedure may be carried out in the manner as described above. That is, a reachability check is performed by AMF 110, and if a SMS is reachable at the target UE, AMF 110 notifies SMSF 120 to transmit the SMS message and forwards it to the target UE.

Figure 5:
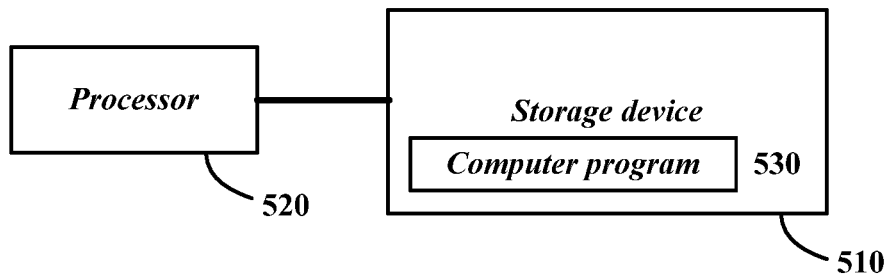
FIG. 5 is a block diagram illustrating an apparatus for providing a user equipment (UE) with directions in a cellular network according to another exemplary embodiment of the present invention.

FIG. 5 is a block diagram illustrating an apparatus for providing a user equipment (UE) with directions in a cellular network according to another exemplary embodiment of the present invention.

With reference to FIG. 5, the apparatus 50 comprises a storage device 510 and a processor 520 coupled to the storage device 510. The storage device 510 is configured to store a computer program 530 comprising computer instructions. The processor 520 is configured to execute the computer instructions to perform some or all of the method steps as shown in FIG. 4.

According to another embodiments of the present invention, it provides a computer program product for providing a user equipment (UE) with directions in a cellular network, the computer program product being embodied in a computer readable storage medium and comprising computer instructions to perform some or all of the method steps as shown in FIG. 4.

Figure 6:
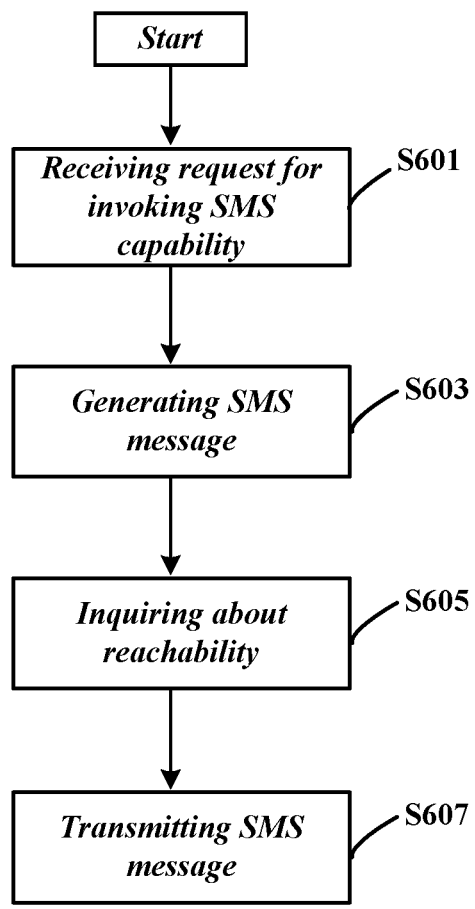
FIG. 6 is a flow diagram illustrating a process for providing a user equipment (UE) with directions in a cellular network according to another exemplary embodiment of the present invention.

FIG. 6 is a flow diagram illustrating a process for providing a user equipment (UE) with directions in a cellular network according to another exemplary embodiment of the present invention.

With reference to FIG. 6, at step S601, SMSF 120 receives a request for invoking SMS capability from an NF, e.g., AMF 110 or UDM 140. For illustrative purpose, the request may include SMS contents concerning the directions and a target UE identifier.

At step S603, in response to the request, SMSF 120 generates a SMS message including the directions and the target UE identifier.

Then, the process proceeds to step S605 where SMSF 120 inquires AMF 110 about whether a SMS is reachable at the target UE, e.g., UE 130.

At step S607, in response to a reply that the SMS is reachable from AMF 110, SMSF 120 transmits to the target UE the SMS message via AMF 110.

Figure 7:
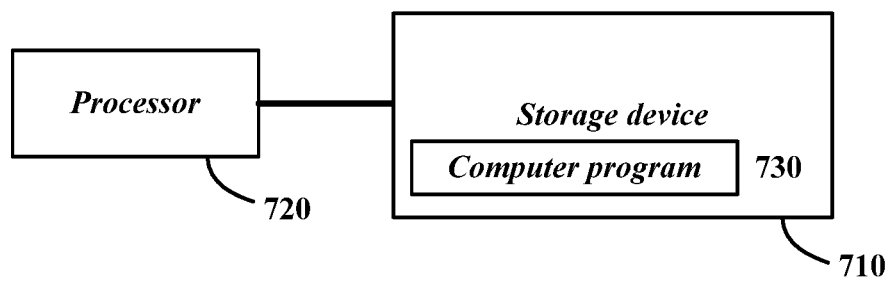
FIG. 7 is a block diagram illustrating an apparatus for providing a user equipment (UE) with directions in a cellular network according to another exemplary embodiment of the present invention.

FIG. 7 is a block diagram illustrating an apparatus for providing a user equipment (UE) with directions in a cellular network according to another exemplary embodiment of the present invention.

With reference to FIG. 7, the apparatus 70 comprises a storage device 710 and a processor 720 coupled to the storage device 710. The storage device 710 is configured to store a computer program 730 comprising computer instructions. The processor 720 is configured to execute the computer instructions to perform some or all of the method steps as shown in FIG. 6.

According to another embodiments of the present invention, it provides a computer program product for providing a user equipment (UE) with directions in a cellular network, the computer program product being embodied in a computer readable storage medium and comprising computer instructions to perform some or all of the method steps as shown in FIG. 6.

Figure 8:
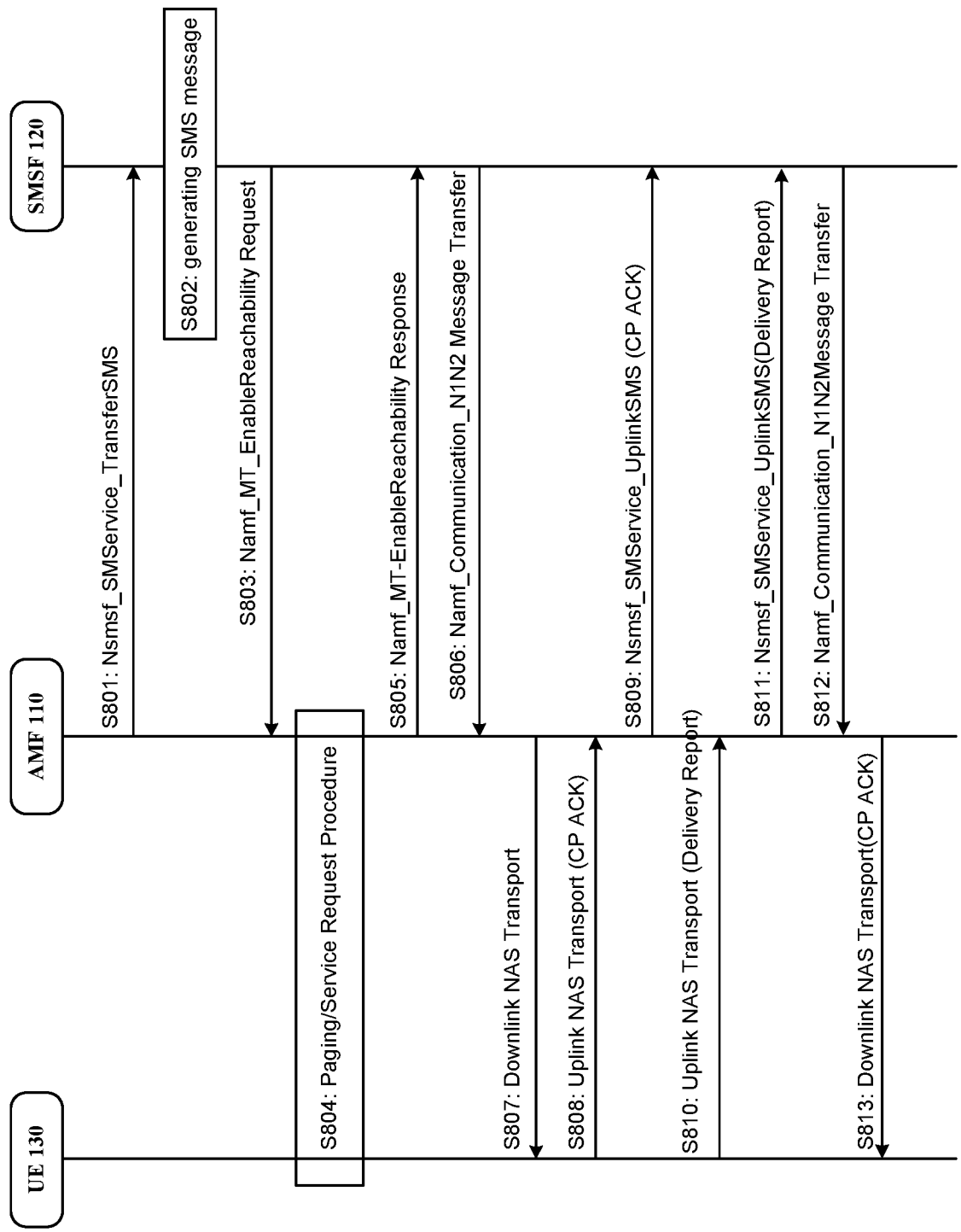
FIG. 8 shows Directions Transmission procedure in a cellular network according to another exemplary embodiment of the present invention.

FIG. 8 shows Directions Transmission procedure in a cellular network according to another exemplary embodiment of the present invention. For illustrative purpose, the procedure is described in the context of the system architecture for SMS over NAS described with reference to FIG. 1.

With reference to FIG. 8, at step 801, when determining there are directions that need to be transferred to a specified UE, e.g., UE 130, an NF for access and mobility management, e.g., AMF 110 herein, invokes SMS capability, e.g., in form of Nsmsf_SMService_TransferSMS operation supplied by SMSF 120. The invoking operation includes transmission of SMS contents concerning the directions and a target UE identifier to SMSF 120 via N20/Nsmsf interface.

At step S802, SMSF 120 generates a SMS message including the SMS contents and the target UE identifier.

Then, at step S803, SMSF 120 transmits a request for inquiring SMS reachability at the target UE, e.g., in form of Namf_MT_EnableReachability Request, to AMF 110 via N20/Nsmsf interface. As a response, at step S804, AMF 110 pages the target UE, e.g., by initiating Paging/Service Request Procedure, for determining the SMS reachability, and at step S805, AMF 110 returns a response, e.g., in form of Namf_MT-EnableReachability Response, for notifying SMSF 120 of the SMS reachability.

At step S806, in response to the SMS reachability, SMSF 120 transmits the SMS message to AMF 110, e.g., by invoking Namf_Communication_N1N2 Message Transfer operation. At step S807, upon receiving the SMS message, AMF 110 forwards it to the target UE, e.g., by invoking Downlink NAS Transport operation.

At step S808, the target UE, e.g., UE 130 transmits to AMF 110 a message for acknowledging receipt of the SMS message, e.g., by invoking Uplink NAS Transport (CP ACK) operation. Then, at step S809, AMF 110 forwards the message for acknowledging to SMSF 120, e.g., by invoking Nsmsf_SMService_UplinkSMS (CP ACK) operation.

At step S810, UE 130 transmits to AMF 110 a delivery report, which is, e.g., encapsulated in an NAS message. The transmission may be performed by invoking Uplink NAS Transport (Delivery Report) operation. Then, at step S811, AMF 110 forwards the delivery report to SMSF 120 by invoking Nsmsf_SMService_UplinkSMS (Delivery Report) operation.

At step S812, SMSF 120 acknowledges receipt of the delivery report by transmitting SMS CP ACK message to AMF 110, e.g., by invoking Namf_Communication_N1N2Message Transfer (CP ACK) operation. Then, at step S813, AMF 110 forwards SMS CP ACK message to UE 130, e.g., by invoking Downlink NAS Transport (CP ACK) operation.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names. While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method, performed by a network function (NF) for access and mobility management, for providing directions to a user equipment (UE) in a communication network, the method comprising:
   determining if directions are to be transferred to the UE;
   instructing a short message service function (SMSF) to generate, based on the determination, a message including the directions, wherein the directions refer to instructions for taking actions by a user of the UE for troubleshooting problems concerning operational parameters of the UE;
   receiving, from the SMSF, the message including the directions; and
   forwarding the message including the directions to the UE,
     wherein the directions are related to adjusting the operational parameters of the UE, reporting an occurrence of a fault at the UE, tracing and correcting a fault occurring at the UE, and/or testing new NF(s) at the UE, and
     wherein the message including the directions is transmitted over a Non-access Stratum.

2. The method of claim 1, wherein the instructing is performed by transmitting, to the SMSF, contents concerning the directions and an identifier (ID) for the UE.

3. The method of claim 1, wherein the method comprises, prior to the receiving:
   determining whether a short message service (SMS) is reachable at the UE by initiating a procedure for paging the UE; and
   if the SMS is reachable, notifying the SMSF of transmitting the message including the directions to the NF for access and mobility management.

4. The method of claim 1, wherein the NF for access and mobility management is implemented by an access and mobility function (AMF).

5. An apparatus for providing directions to a user equipment (UE) in a communication network, the apparatus comprising:
   processing circuitry;
   memory containing instructions executable by the processing circuitry whereby the apparatus is operative to:
     determine if directions are to be transferred to the UE;
     instruct a short message service function (SMSF) to generate, based on the determination, a message including the directions, wherein the directions refer to instructions for taking actions by a user of the UE for troubleshooting problems concerning operational parameters of the UE;

receive, from the SMSF, the message including the directions; and forward the message including the directions to the UE, wherein the directions are related to adjusting the operational parameters of the UE, reporting an occurrence of a fault at the UE, tracing and correcting a fault occurring at the UE, and/or testing new NF(s) at the UE, and wherein the message including the directions is transmitted over a Non-access Stratum.

6. A method, performed by a short message service function (SMSF), for providing directions to a user equipment (UE) in a communication network, the method comprising the SMSF:

receiving an instruction from a network function (NF), the instruction based on a determination if directions are to be transferred to the UE;

generating, in response receiving an instruction from the NF for access and mobility management, a message including the directions, wherein the directions refer to instructions for taking actions by a user of the UE for troubleshooting problems concerning operational parameters of the UE; and transmitting, to the UE, the message including the directions via the NF for access and mobility management, wherein the directions are concerned with adjusting the operational parameters of the UE, reporting an occurrence of a fault at the UE, tracing and correcting a fault occurring at the UE, and/or testing new NF(s) at the UE, and wherein the message including the directions is transmitted over a Non-access Stratum.

7. The method of claim 6, wherein the instruction includes contents concerning the directions and an identifier (ID) for the UE.

8. The method of claim 6, wherein the method comprises, prior to the transmitting, inquiring whether a short message service (SMS) is reachable at the UE.

9. An apparatus for providing directions to a user equipment (UE) in a communication network, the apparatus comprising:

processing circuitry;

memory containing instructions executable by the processing circuitry whereby the apparatus is operative to:

receive an instruction from a network function (NF), the instruction based on a determination if directions are to be transferred to the UE;

generate, in response receiving an instruction from the NF for access and mobility management, a message including the directions, wherein the directions refer to instructions for taking actions by a user of the UE for troubleshooting problems concerning operational parameters of the UE; and transmit, to the UE, the message including the directions via the NF for access and mobility management, wherein the directions are related to adjusting the operational parameters of the UE, reporting an occurrence of a fault at the UE, tracing and correcting a fault occurring at the UE, and/or testing new NF(s) at the UE, and wherein the message including the directions is transmitted over a Non-access Stratum.

10. A method, performed by a network function (NF) for user profile management, for providing directions to a user equipment (UE) in a communication network, the method comprising:

determining whether there are directions that need to be transferred to the UE, wherein the directions refer to instructions for taking actions by a user of the UE for troubleshooting problems concerning operational parameters of the UE; and invoking, if there are directions that need to be transferred, SMS capability supplied by a short message service function (SMSF) by transmitting SMS contents including the directions, wherein the SMSF generates, based on the SMS contents, a message including the directions for the UE, wherein the directions are related to adjusting the operational parameters of the UE, reporting an occurrence of a fault at the UE, tracing and correcting a fault occurring at the UE, and/or testing new NF(s) at the UE, and wherein the message including the directions is transmitted over a Non-access Stratum.

11. The method of claim 10, wherein the SMS contents further comprise an identifier (ID) for the UE.

12. The method of claim 10, wherein the NF for user profile management is implemented by a unified database management (UDM).

13. An apparatus for providing directions to a user equipment (UE) in a communication network, the apparatus comprising:

processing circuitry;

memory containing instructions executable by the processing circuitry whereby the apparatus is operative to:

determining whether there are directions that need to be transferred to the UE, wherein the directions refer to instructions for taking actions by a user of the UE for troubleshooting problems concerning operational parameters of the UE; and invoke, if there are directions that need to be transferred, SMS capability supplied by a short message service function (SMSF) by transmitting SMS contents including the directions, wherein the SMSF generates, based on the SMS contents, a message including the directions for the UE, wherein the directions are related to adjusting the operational parameters of the UE, reporting an occurrence of a fault at the UE, tracing and correcting a fault occurring at the UE, and/or testing new NF(s) at the UE, and wherein the message including the directions is transmitted over a Non-access Stratum.

* * * * *